United States Patent
Wan et al.

(10) Patent No.: US 11,652,380 B2
(45) Date of Patent: May 16, 2023

(54) ELECTRIC MOTOR AND A METHOD OF ASSEMBLING SAME

(71) Applicant: Steering Solutions IP Holding Corporation, Saginaw, MI (US)

(72) Inventors: Zhao Wan, Carmel, IN (US); Mojtaba Bahrami Kouhshahi, Saginaw, MI (US); Robert W. Long, Midland, MI (US); Kenneth P. Webber, Jr., Saginaw, MI (US); Jeffrey T. Klass, Kawkawlin, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 142 days.

(21) Appl. No.: 17/123,853

(22) Filed: Dec. 16, 2020

(65) Prior Publication Data

US 2022/0190662 A1    Jun. 16, 2022

(51) Int. Cl.
*H02K 5/24* (2006.01)
*H02K 3/20* (2006.01)
*H02K 1/14* (2006.01)
*H02K 1/18* (2006.01)

(52) U.S. Cl.
CPC ............... *H02K 3/20* (2013.01); *H02K 1/146* (2013.01); *H02K 5/24* (2013.01); *H02K 1/185* (2013.01)

(58) Field of Classification Search
CPC .................................. H02K 5/24; H02K 1/146
See application file for complete search history.

(56) References Cited

U.S. PATENT DOCUMENTS

| | | | |
|---|---|---|---|
| 11,233,445 B2 * | 1/2022 | Sozer | H02K 37/04 |
| 2004/0119367 A1 | 6/2004 | Hiwaki et al. | |
| 2019/0165621 A1 * | 5/2019 | Benarous | H02K 1/16 |
| 2020/0119631 A1 * | 4/2020 | Sozer | H02K 37/22 |
| 2020/0185983 A1 | 6/2020 | Webber et al. | |
| 2020/0186001 A1 | 6/2020 | Webber et al. | |

* cited by examiner

*Primary Examiner* — Ramon M Barrera
(74) *Attorney, Agent, or Firm* — Dickinson Wright PLLC

(57) ABSTRACT

An electric motor assembly comprising a stator having a plurality of stator lamination sheets. Each of the stator lamination sheets includes an annular body and a plurality of stator teeth extending radially inwardly from the annular body to an opening. A rotor is located in the opening. Each of the stator teeth defining a pocket with a dampening element located in the pocket. The dampening element comprises a material that is viscoelastic. The pocket and dampening element are located in a location of the stator tooth that has less magnetic flux than an adjacent area of the stator tooth.

14 Claims, 6 Drawing Sheets

ELECTRIC MOTOR AND A METHOD OF ASSEMBLING SAME

TECHNICAL FIELD

This disclosure relates to an electric motor and, in particular, to an electric motor with vibration mitigation features and a method of assembling same.

BACKGROUND

Electric motors are used in a wide range of applications to convert electrical energy into mechanical rotation. Electric motors typically include a stator and a rotor. The stator generates a magnetic field via application of current that is applied as torque on the rotor causing it to rotate. Stators can generate the magnetic field through either direct current (DC) or alternating current (AC) configurations. The magnetic field both attracts and repels the rotor to generating torque thus causing it to rotate.

In some configurations, electric motors include a rotor with a number of permanent magnet poles and a stator with a multi-phase winding laying inside a number of stator slots. These electric motors are oftentimes referred to as permanent magnet motors. The combination of the number of rotor poles and the stator slots determine the performance of the motor e.g., output torque, power, torque ripple and vibration/noise. Permanent magnet motors with fractional number of stator slots per each rotor pole, i.e., fractional slot permanent magnet motors, offer high torque density, low torque ripple usually by skewing rotor/stator poles, and high flux-weakening capability. For example, some popular configurations include 9 slots and 6 poles, 12 slots and 8 poles, or 12 slots and 10 poles. Electric motors with 12 slots and 10 poles have been shown to have favorable characteristics over conventionally used electric motors with 12 slots and 8 poles or 9 slots and 6 poles. Indeed, electric motors with 12 slots and 10 poles generally have lower torque ripple, higher power/torque densities, and lower cogging torque even without skewing. These attributes can result in lower cost and smaller packaging compared to other configurations. However, the low order mode shape for deflection with this electric motor configuration makes it more challenging with respect to noise, vibration, and harshness (NVH). Various methods have been proposed to address this issue including electromagnetic and structural solutions.

Electromagnetic solutions usually strive for reduction of radial forces in the machine or the elimination of specific harmonics that contribute to low order mode shape. However, these solutions usually have a negative effect to the magnetic performance of the motor including negative impacts to the average torque and the cogging torque. Structural solutions, on the other hand, have less effect on the electromagnetic performance of the motor. Physical parts or features are implemented to dampen the vibration. Various implementations have been proposed including profiling the outer circumference of the stator, using spring devices as damper between the stator and a housing, and additional implementations. However, these structural solutions generally include increases in cost, weight, and complexity of the electric motor for only limited reductions in NVH.

Accordingly, there is a continued interest of developing solutions to minimize NVH in electric motors.

SUMMARY

This disclosure relates generally to a stator tooth for an electric motor. The stator tooth comprises a base portion, a body portion that extends radially inwardly from the base portion, and an interface portion extending from the body portion opposite the base portion. The interface portion defines a surface adjacent to a provided rotor. A pocket is defined by the stator tooth and a dampening element is located in the pocket.

An aspect of the disclosed embodiments includes a stator for an electric motor. The stator comprises a plurality of stator lamination sheets. Each of the plurality of stator lamination sheets includes an annular body and a plurality of stator teeth extending radially inwardly from the annular body to an opening for placing a provided rotor. At least one of the plurality of stator teeth defines a pocket and a dampening element is located in the pocket.

Another aspect of the disclosed embodiments includes an electric motor assembly. The electric motor assembly comprises a stator including a plurality of stator lamination sheets. Each of the plurality of stator lamination sheets includes an annular body and a plurality of stator teeth extending radially inwardly from the annular body to an opening. A rotor is located in the opening. At least one of the plurality of stator teeth defines a pocket and a dampening element is located in the pocket.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
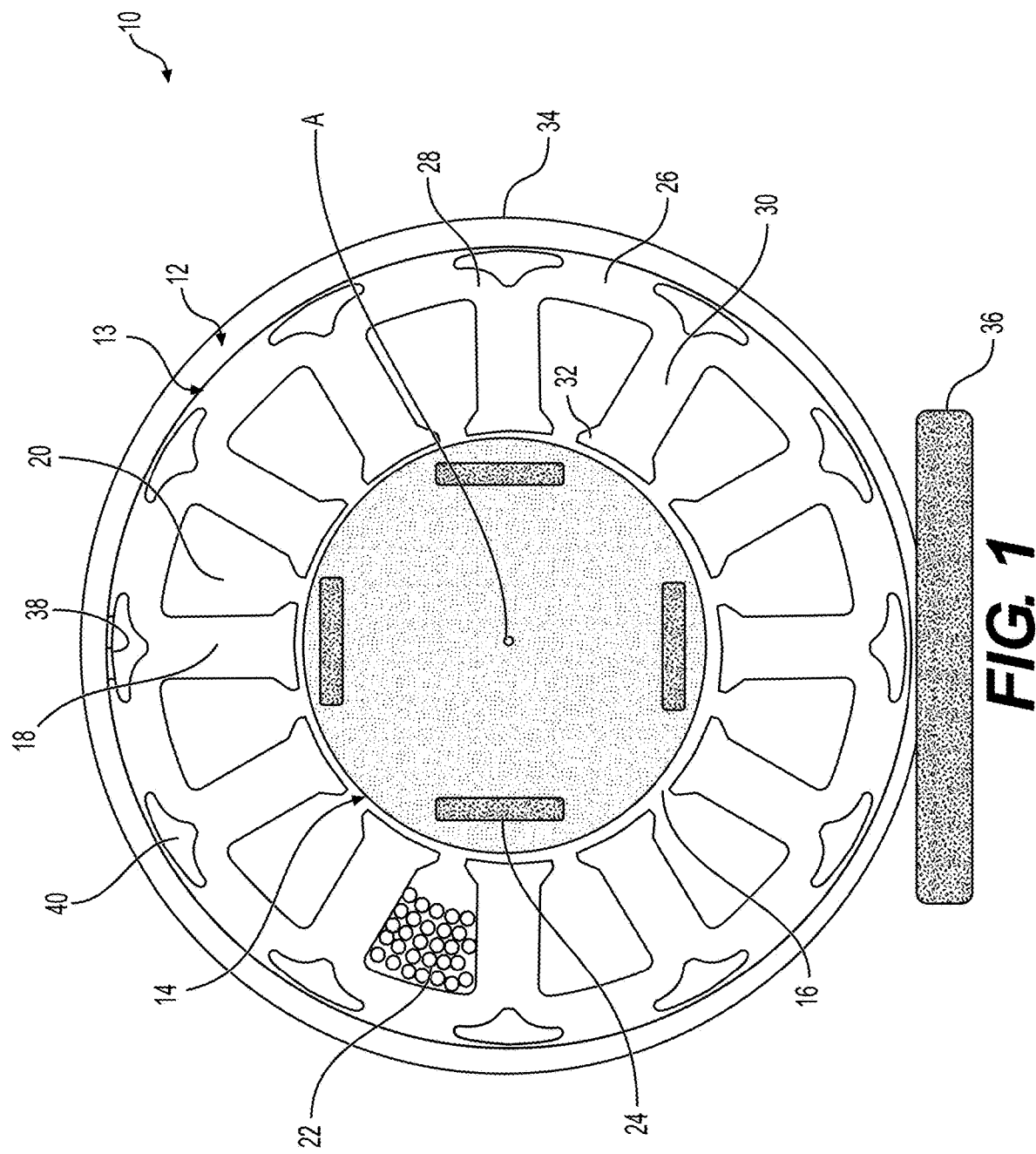
FIG. 1 generally illustrates an electric motor assembly according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, electric motors are used in a wide range of applications to convert electrical energy into mechanical rotation. Electric motors typically include a stator and a rotor. The stator generates a magnetic field via application of current that is applied as torque on the rotor causing it to rotate. Stators can generate the magnetic field through either direct current (DC) or alternating current (AC) configurations. The magnetic field both attracts and repels the rotor to generate torque and cause it to rotate.

Electric motors include poles in the form of permanent magnets or bundled wire in the stator. The number of poles generally corresponds to the torque output, wherein a greater number of poles generates a larger torque. Electric motors further include slots, which dictate the number of phases of power available. In applications requiring a larger amount of torque and a variety of phases, such as in the automobile industry, there are generally a larger amount of both poles and slots. For example, electric motors with 12 slots and 10 poles have been shown to have favorable characteristics over conventionally used electric motors with 12 slots and 8 poles or 9 slots and 6 poles. More specifically, electric motors with 12 slots and 10 poles generally have lower torque ripple, higher power/torque densities, and lower cogging torque even without skewing. These attributes can result in lower cost and smaller packaging compared to other configurations. However, the low order mode shape for deflection with this electric motor makes it more challenging with respect to noise, vibration, and harshness (NVH). Various methods have been proposed to address this issue including electromagnetic and structural solutions.

Electromagnetic solutions usually strive for reduction of radial forces in the machine or the elimination of specific harmonics that contribute to low order mode shape. However, these solutions usually have a negative effect to the magnetic performance of the motor including negative impacts to the average torque and the cogging torque. Structural solutions, on the other hand, have minimal effect on the electromagnetic performance of the motor. Physical parts or features are implemented to dampen the vibration. Various implementations have been proposed including profiling the outer circumference of the stator, using spring devices as damper between stator and the housing, and additional implementations. However, these structural solutions generally include increases in cost, weight, and complexity of the electric motor for only limited reductions in NVH.

Accordingly, an electric motor assembly and a method of assembling same, such as those described herein, configured to mitigate NVH, may be desirable. In some embodiments, the electric motor assembly includes a plurality of slots and a plurality of poles and at least one damping feature integrated into the design of the stator back-iron to mitigate the vibration while not compromising the electromagnetic performance of the motor. In some embodiments, the electric motor assembly includes 12 slots and 10 poles.

In operation, the electric motor assembly may be used in a vehicle, such as a car, truck, sport utility vehicle, crossover, mini-van, marine craft, aircraft, all-terrain vehicle, recreational vehicle, or other suitable vehicles. The vehicle may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. The vehicle may further include a steering system, such as a steer-by-wire system that translates a steering input to an output and ultimately cause the vehicle to turn. The electric motor assembly described herein may be used in a number of automotive applications, such as in the steering system or the propulsion system. For example, the electric motor may be utilized in a steer-by-wire system, a steering assist assembly, autonomous driving steering, and other applications. In some embodiments, the electric motor assembly 10 may be configured as an AC or DC electric motor and may further be configured for a reversed flow of current for providing electric generator functionality. In some embodiments, the electric motor assembly could also be utilized in other contexts.

FIG. 1 generally illustrates the electric motor assembly 10. The electric motor assembly 10 includes a stator 12 and a rotor 14. The stator 12 may define a plurality of stator lamination sheets 13 that defines a passage 16 along an axis A and the rotor 14 is located within the passage 16. The stator lamination sheets 13 of the stator 12 include a plurality of stator teeth 18 disposed circumferentially about the axis A. The stator lamination sheets 13 may be stacked along the axis A. Slots 20 circumferentially space each of the stator teeth 18. The stator 12 includes at least one magnetic field actuator 22, such as wound coils located in at least one of the slots 20, for generating a magnetic field. In some embodiments, the at least one magnetic field actuator 22 includes a wound coil in each of the slots 20. The rotor 14 may further include magnetic elements 24 located in or around an outer surface thereof for reacting to the generated magnetic field and causing the rotor 14 to rotate. The rotor 14 may be integral with or otherwise attached to a component of an automobile, for example, a drive shaft of a propulsion system. Each stator lamination sheet 13 further includes an annular body 26 and the stator teeth 18 may be integrally formed or otherwise connected to the annular body 26 and extend radially inward therefrom towards the rotor 14. More particularly, each stator tooth 18 includes a base portion 28 on the annular body 26, a body portion 30 that extends radially inwardly, and an interface portion 32 that tapers outwardly from the body portion 30 to define a rounded cam surface substantially equal, or slightly larger than, a circumference of the rotor 14. The stator lamination sheets 13, the magnetic field actuator 22, and the rotor 14 are located within an electric motor housing 34. At least one mounting bracket 36 may connect the electric motor housing 34 to a larger component, such as a component of an automobile.

In operation, the magnetic field actuator 22 generates a magnetic field that interacts with the rotor 14 (e.g., magnetic elements 24) to develop torque and cause the rotor 14 to rotate about the axis A. During rotation, the interaction between the magnetic field of the rotor 14 and the field actuator 22 creates a magnetic force on teeth 18, which then is transferred to the motor housing 34, and causes vibration of motor housing 34, and ultimately the mounting bracket 36 and larger component that is attached thereto. When the electric motor assembly 10 is connected to a vehicle, this unwanted vibration can negatively impact performance and also an occupant's riding experience. To absorb these vibrations, at least one of the teeth 18 includes a pocket 38 which, upon receiving the vibrational force applied to the teeth 18, deforms and suppresses a portion of vibration to be transferred to the housing 34. Each pocket 38 may further include a dampening element 40 located in the pocket 38 to further dampen vibrations. The dampening element 40 may be formed of a material that exhibits viscosity, elasticity, or both. For example, the dampening element 40 may comprise an elastic material such as a viscoelastic material. The viscoelastic material may thus provide both viscous and elastic dampening characteristics. In some embodiments, the dampening element 40 comprises amorphous polymers, semi-crystalline polymers, biopolymers, bitumen materials, or combinations thereof. In some embodiments, only one tooth 18 includes a pocket 38, each tooth 18 may include a pocket 38, only alternate teeth 18 may include a pocket 38, or only one of one of each diametrically opposed teeth 18 may include a pocket 38. In some embodiments, each pocket 38 may include a dampening element 40, alternating pockets 38 may include a dampening element 40, or diametrically opposed teeth 18 may include two pockets 38 but only one dampening element 40.

Figure 2:
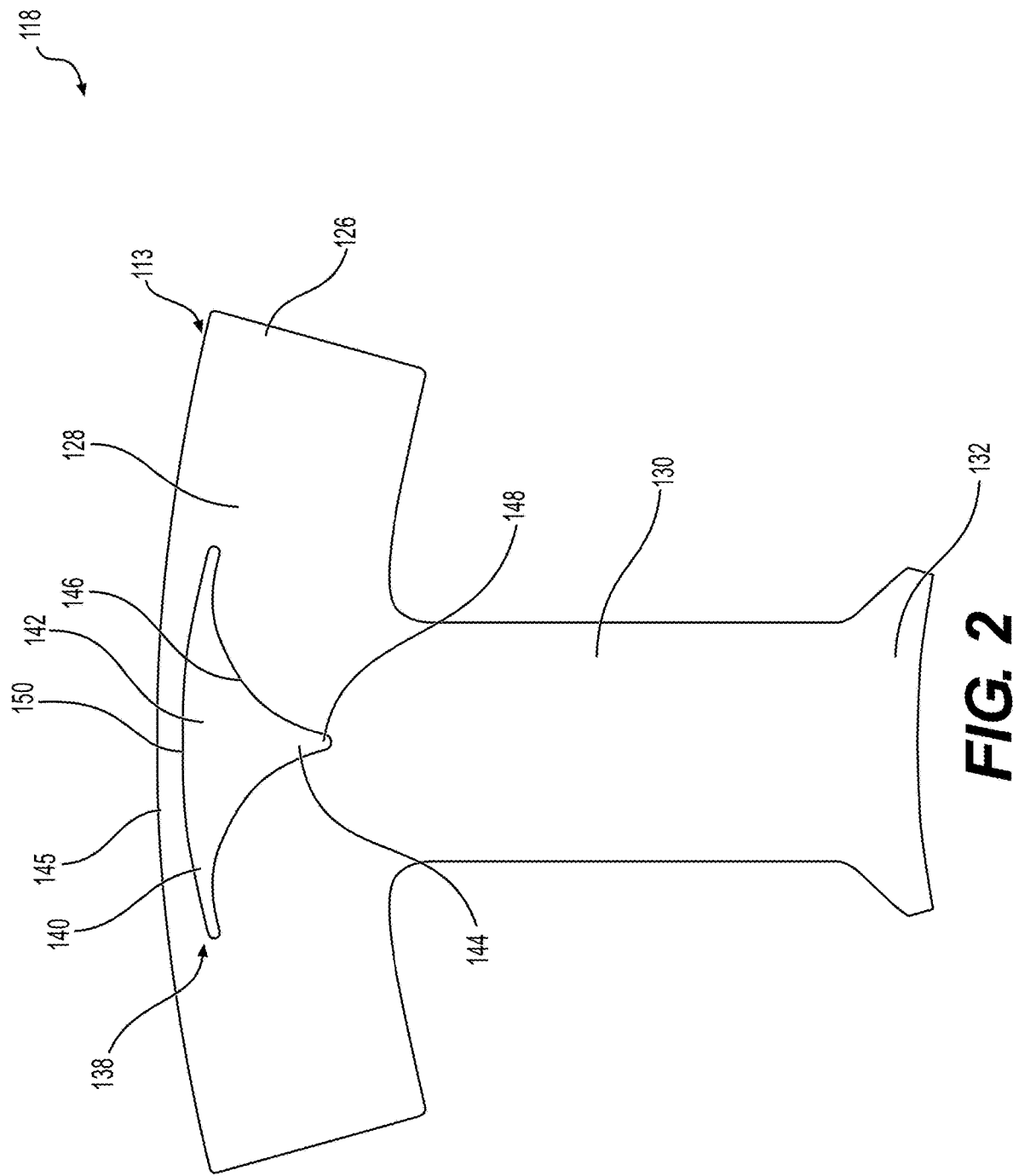
FIG. 2 generally illustrates a stator tooth according to a first embodiment of the present disclosure.

With reference now to FIG. 2, a first embodiment of the stator tooth 118 is presented, wherein the stator tooth 118 has been isolated from the stator lamination sheet 113. The stator tooth 118 includes a base portion 128, a body portion 130 that extends radially inwardly, and an interface portion 132 that tapers outwardly from the body portion 130 to define a rounded cam surface substantially equal, or slightly larger than, a circumference of the rotor 14. The pocket 138 is located centrally in the base portion 128 and defines a triangular shape. The triangular shape may include a rounded head portion 142 located near an outer circumference of the annular body 126 and a tail portion 144 that extends towards the axis A. The stator tooth 118 further includes a spring strip 145 located between the pocket 138 and the outer circumference of the annular body 126. The tail portion 144 may be defined by opposite edges 146 that may be symmetrical and rounded from the head portion 142 to an apex 148. The head portion 142 may be rounded to define a circumference that is greater than, equal to, or less than the outer circumference of the annular body 126. In the illustrated arrangement, the head portion 142 is rounded to define a radius slightly less than a radius of the outer circumference of the annular body 126. The opposite edges 146 of the tail portion 144 may be rounded radially inwardly from the head portion 142 at a radius that is less than the radius defined by an outer edge 150 of the head portion 142. The dampening element 140 may be located in the pocket 138 and fill the entire pocket 138 or at least an entire cross-section of the pocket 138. As described, in some embodiments, the dampening elements 140 may not be disposed in the pockets 138, they may be disposed in select pockets 138, or they may be disposed in every pocket 138.

Figure 3:
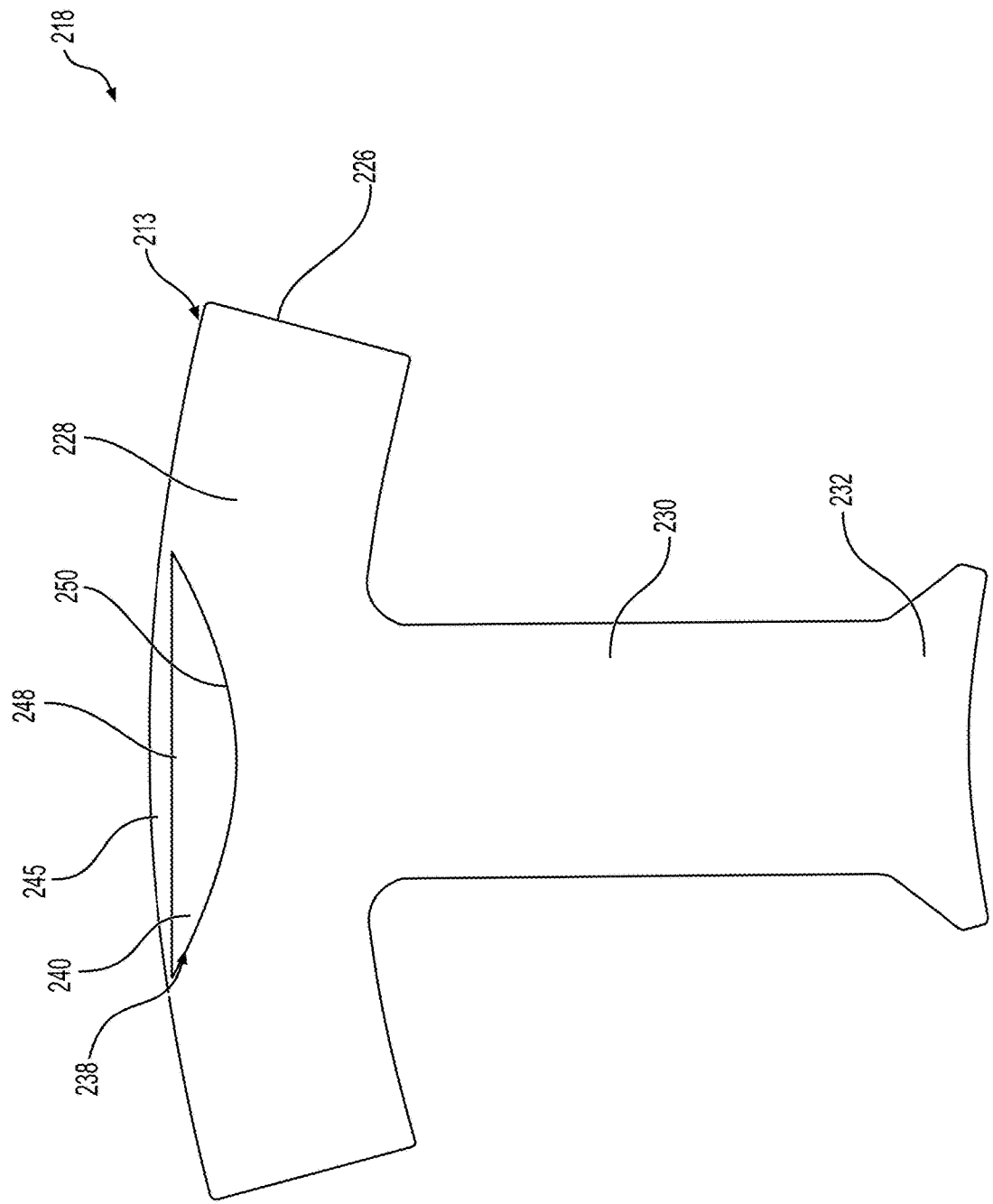
FIG. 3 generally illustrates a stator tooth according to a second embodiment of the present disclosure.

With reference now to FIG. 3, a second embodiment of the stator tooth 218 is presented, wherein the stator tooth 218 has been isolated from the stator lamination sheet 213. The stator tooth 218 includes a base portion 228, a body portion 230 that extends radially inwardly, and an interface portion 232 that tapers outwardly from the body portion 230 to define a rounded cam surface substantially equal, or slightly larger than, a circumference of the rotor 214. The pocket 238 is located centrally in the base portion 228 and defines a partially circular shape, for example a semi-elliptical shape. The semi-circular shape may include a top edge 248 that is substantially flat and a rounded bottom edge 250 that extends radially outwardly from opposite ends of the top edge 248. The rounded bottom edge 250 may be defined by one radius (i.e., circular) or more than one radius (i.e., elliptical). The dampening element 240 may be located in the pocket 238 and fill the entire pocket 238 or at least an entire cross-section of the pocket 238. The stator tooth 218 further includes a spring strip 245 located between the pocket 238 and the outer circumference of the annular body 226. As described, in some embodiments, the dampening elements 240 may not be disposed in the pockets 238, they may be disposed in select pockets 238, or they may be disposed in every pocket 238

Figure 4:
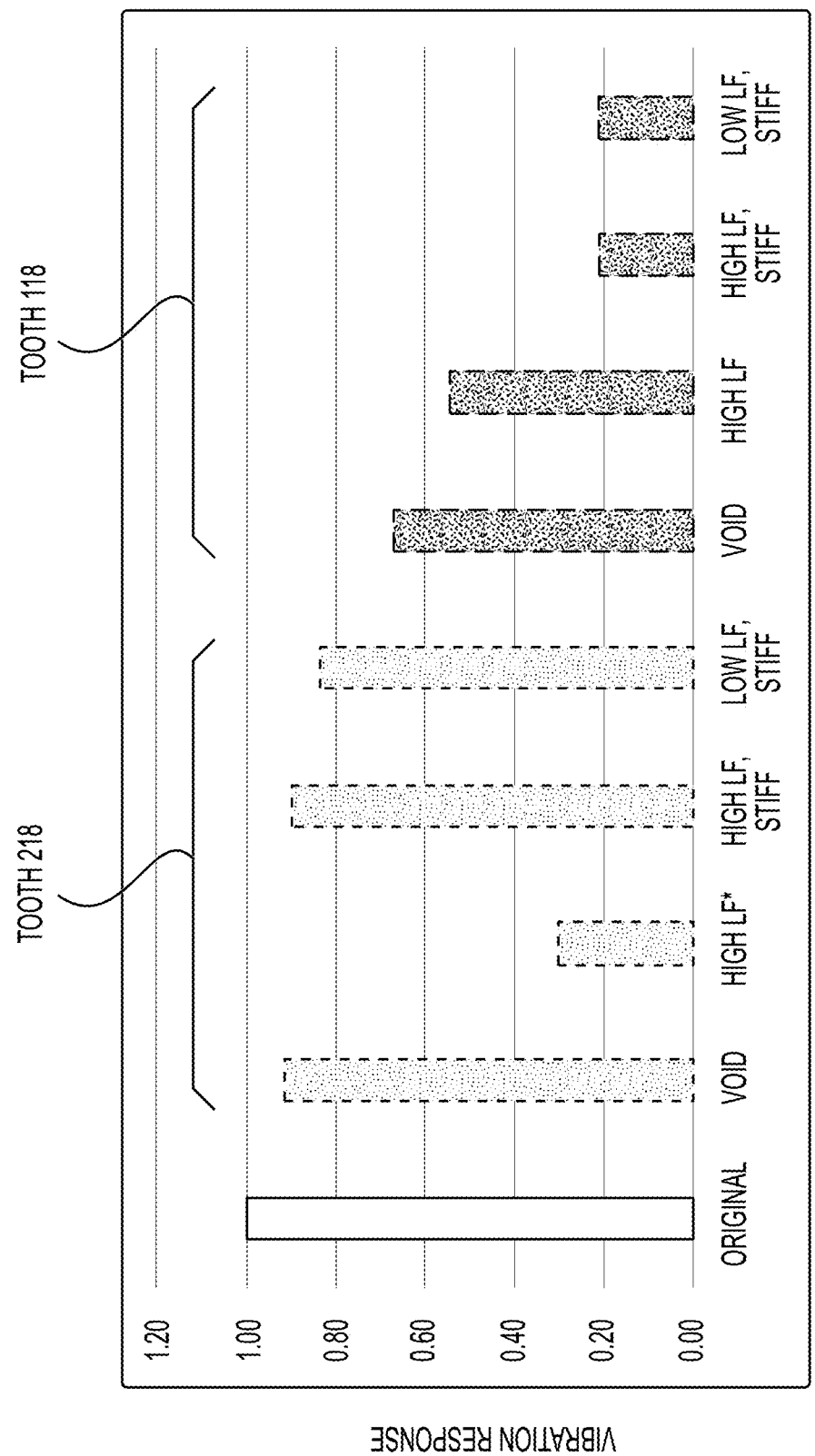
FIG. 4 is a graphical representation of a normalized vibration response of various stator tooth configurations.

In some embodiments, the annular body 26 may include both embodiments of stator teeth 138, 238 that are arranged alternatively or in diametrically opposite position. In operation, dampening effects may be aggregated between various combinations of the pocket, the spring strip, the dampening member, and additional portions of the stator tooth. With reference now to FIG. 4, a graphical illustration of simulated test results are provided, wherein the effectiveness of various configurations of a single tooth are compared. During the simulation, a unit force with a fixed frequency is applied to the interface portion of the tooth, while the remainder of the tooth is calculated as fixed support. Surface deformation as a function of surface velocity is calculated at interface portion. The graphical representation illustrates a normalized vibration response (e.g., radial velocity) to the applied unit force for the embodiments (FIG. 2 and FIG. 3) with dampening elements, the embodiments (FIG. 2 and FIG. 3) with pockets without dampening elements, and a tooth without any pockets. The term "Original" refers to the design without any pockets, the term "Void" refers to a design with pockets but without dampening members, "High LF" means a dampening element comprising viscoelastic material with high loss factor, and "Stiff" refers to the stiffness of the dampening element.

Figure 5:
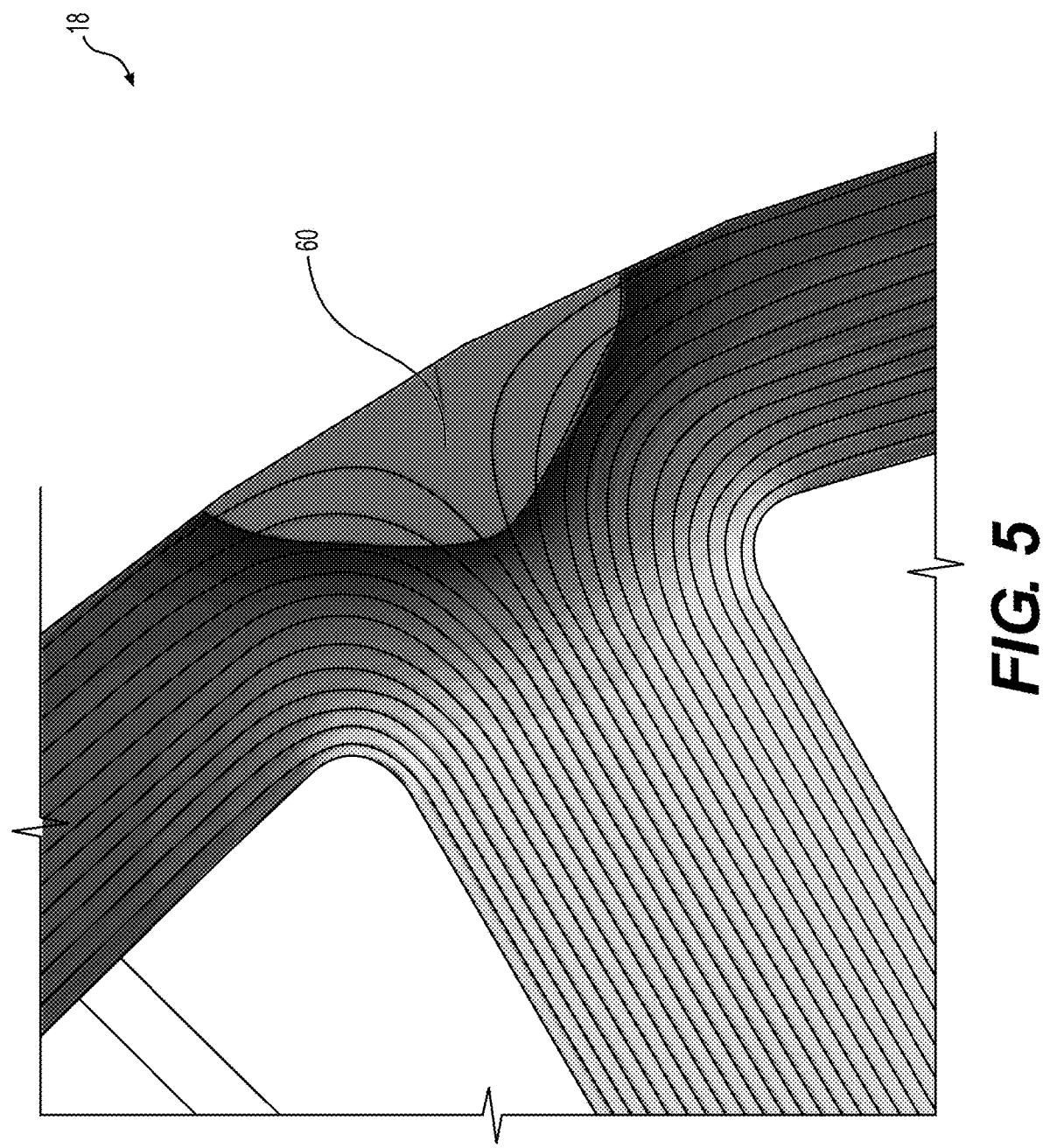
FIG. 5 illustrates the magnetic flux through a stator tooth when energized via operation of the electric motor assembly.

With reference now to FIG. 5, a magnetic flux density of a tooth 18, when there is no damping pocket 38 is considered, is illustrated. As shown, location 60 substantially centrally to the tooth 18 receives less magnetic flux than surrounding areas. Removal of stator material in this location is expected to have minimal impact on the performance of the motor. Therefore, the pockets (e.g., pocket 138 and pocket 238), the dampening element 40, and the spring strip (e.g., the spring strip 145 and the spring strip 245) can be located in this area for damping purposes without effecting the magnetic performance of the motor. As such, before forming teeth 18 with pockets (e.g., pocket 138 and pocket 238) a magnetic flux profile can be considered to guide the location of pockets (e.g., pocket 138 and pocket 238) for future like configurations.

Figure 6:
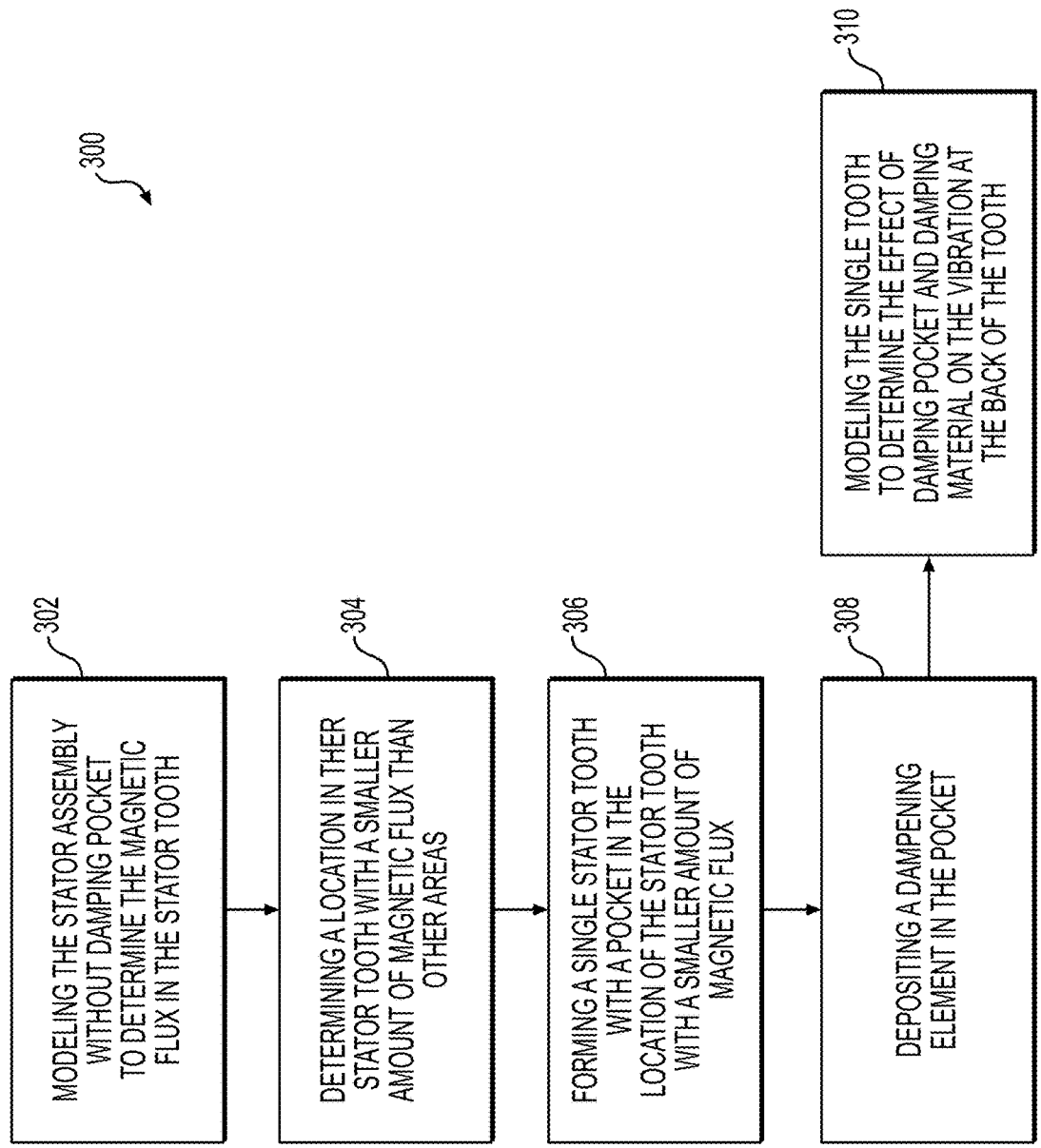
FIG. 6 is a flow diagram generally illustrating a method of forming a stator tooth according to the principles of the present disclosure.

With reference now to FIG. 6, a method 300 of assembling a stator tooth is provided. At 302, the method 300 includes modeling the stator assembly, e.g., the stator tooth, without a pocket or dampening member, to determine the magnetic flux in the stator tooth. At 304, the method 300 includes determining a location in the stator tooth with a smaller amount of magnetic flux than other areas of the stator tooth, for example, adjacent areas or surrounding areas. At 306, the method includes forming a single stator tooth or a plurality of stator teeth with a pocket in the location of the stator tooth with a smaller amount of magnetic flux. At 308, the method 300 includes depositing a dampening element in the pocket. Step 308 may include injecting, molding, or other methodologies for depositing the dampening element. At 310, the method includes modeling the formed single stator tooth or the formed plurality of stator teeth with a pocket and dampening element to determine the effect of the pocket (i.e., dampening pocket) and dampening element of dampening material on the vibration at a back portion of the tooth. Repeated assemblies may only repeat steps 304 and 306 and may include forming stator lamination sheets including at least one stator tooth with the pocket and dampening element.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A stator tooth for an electric motor comprising:
   a base portion;
   a body portion that extends radially inwardly from the base portion;
   an interface portion extending from the body portion opposite the base portion, the interface portion defining a surface adjacent to a provided rotor;
   a pocket defined by the stator tooth; and
   a dampening element located in the pocket,
   wherein the pocket includes a top edge and a bottom edge, the top edge located near an outer edge of the base portion opposite the body portion, the bottom edge extending towards the body portion, wherein the top edge is flat and the bottom edge is rounded.

2. The stator tooth of claim 1, wherein the dampening element comprises a material that is elastic.

3. The stator tooth of claim 1, wherein the dampening element comprises a material that is viscous.

4. The stator tooth of claim 1, wherein the dampening element comprises a material that is viscoelastic.

5. The stator tooth of claim 1, wherein the pocket and the dampening element are located centrally in the base portion and adjacent to the outer edge of the base portion opposite the body portion to define a spring strip.

6. The stator tooth of claim 1, wherein the dampening element extends between the top edge and the bottom edge.

7. The stator tooth of claim 1, wherein the pocket is located in a location of the stator tooth with less magnetic flux than at least one adjacent area of the stator tooth.

8. A stator for an electric motor comprising:
   a plurality of stator lamination sheets;
   each of the plurality of stator lamination sheets including an annular body and a plurality of stator teeth extending radially inwardly from the annular body to an opening for placing a provided rotor;
   at least one of the plurality of stator teeth defining a pocket; and
   a dampening element located in the pocket,
   wherein the pocket includes a top edge and a bottom edge, the top edge located near an outer edge of a base portion of the at least one of the plurality of stator teeth, the bottom edge extending towards a body portion of the at least one of the plurality of stator teeth, wherein the top edge is flat and the bottom edge is rounded.

9. The stator for an electric motor of claim 8, wherein each of the plurality of stator teeth includes a pocket.

10. The stator for an electric motor of claim 9, wherein each of the pockets includes a dampening element located therein.

11. The stator for an electric motor of claim 8, wherein the pocket is located in a location of the stator tooth with less magnetic flux than at least one adjacent area of the stator tooth.

12. The stator for an electric motor of claim 8, wherein the dampening element comprises a material that is viscoelastic.

13. An electric motor assembly comprising:
   a stator including a plurality of stator lamination sheets;
   each of the plurality of stator lamination sheets including an annular body and a plurality of stator teeth extending radially inwardly from the annular body to an opening;
   a rotor located in the opening;
   at least one of the plurality of stator teeth defining a pocket; and
   a dampening element located in the pocket,
   wherein the pocket includes a top edge and a bottom edge, the top edge located near an outer edge of a base portion of the at least one of the plurality of stator teeth, the bottom edge extending towards a body portion of the at least one of the plurality of stator teeth, wherein the top edge is flat and the bottom edge is round.

14. The stator for an electric motor of claim 13, wherein the dampening element comprises a material that is viscoelastic.

* * * * *